United States Patent
Aldana et al.

(10) Patent No.: US 9,523,495 B1
(45) Date of Patent: Dec. 20, 2016

(54) BICYCLE ILLLUMINATOR CONDUCTOR ASSEMBLY

(76) Inventors: Jorge Vidal Aldana, Hialeah, FL (US); Jorge Vidal Quintero, Hialeah, FL (US)

(*) Notice: Subject to any disclaimer, the term of this patent is extended or adjusted under 35 U.S.C. 154(b) by 894 days.

(21) Appl. No.: 13/544,732

(22) Filed: Jul. 9, 2012

(51) Int. Cl.
*B62J 6/00* (2006.01)
*F21V 33/00* (2006.01)

(52) U.S. Cl.
CPC ...................... *F21V 33/00* (2013.01)

(58) Field of Classification Search
CPC ........ F21W 101/023; F21V 33/00; B62J 6/00; B60Q 1/26; F21S 8/10
See application file for complete search history.

(56) References Cited

U.S. PATENT DOCUMENTS

| | | | |
|---|---|---|---|
| 4,225,848 A * | 9/1980 | Roberts | B62J 6/20 200/61.12 |
| D373,839 S | 9/1996 | Rasul | |
| 6,779,913 B2 | 8/2004 | Niezrecki et al. | |
| 6,832,847 B2 | 12/2004 | Frosythe et al. | |
| 7,021,800 B2 | 4/2006 | Roberts | |
| 7,145,256 B2 | 12/2006 | Koharcheck et al. | |
| 7,441,914 B2 * | 10/2008 | Palmer | B60Q 1/326 362/473 |
| 8,337,060 B1 * | 12/2012 | Frankovich | B60Q 1/326 315/76 |
| 2003/0112632 A1 * | 6/2003 | Forsythe | B62J 6/20 362/473 |
| 2006/0092647 A1 * | 5/2006 | Glasser | B62J 6/20 362/473 |
| 2012/0200401 A1 * | 8/2012 | Goldwater | B62J 6/20 340/432 |

* cited by examiner

*Primary Examiner* — Donald Raleigh

(57) ABSTRACT

A bicycle illumination conductor assembly includes a primary plate coupled the bicycle axle. A secondary member is coupled to the bicycle and to the primary plate. A front light emitter is coupled to a front of the bicycle and to the secondary member. A rear light emitter is coupled to a rear of the bicycle and to the secondary member. The rear light emitter selectively emits a beam of light so the rear light emitter may be visible to an observer. A wheel light emitter is coupled to a spoke on the bicycle and to the primary plate. The front light emitter, the rear light emitter and the wheel light emitter selectively emits a beam of light so the bicycle may be visible to an observer. A power supply is coupled to the front light emitter and is operationally coupled to the front light emitter and the rear light emitter.

17 Claims, 5 Drawing Sheets

US 9,523,495 B1

BICYCLE ILLLUMINATOR CONDUCTOR ASSEMBLY

BACKGROUND OF THE DISCLOSURE

Field of the Disclosure

The disclosure relates to bicycle illumination conductor assemblies and more particularly pertains to a new bicycle illumination conductor assembly for illuminating a bicycle.

SUMMARY OF THE DISCLOSURE

An embodiment of the disclosure meets the needs presented above by generally comprising a primary plate coupled the bicycle axle. A secondary member is coupled to the bicycle. The secondary member is operationally coupled to the primary plate. A front light emitter is coupled to a front of the bicycle. The front light emitter is operationally coupled to the secondary member. The front light emitter selectively emits a beam of light so the front light emitter may be visible to an observer. A rear light emitter is coupled to a rear of the bicycle. The rear light emitter is operationally coupled to the secondary member. The rear light emitter selectively emits a beam of light so the rear light emitter may be visible to an observer. A wheel light emitter is coupled to a spoke on the bicycle. The wheel light emitter is operationally coupled to the primary plate. The wheel light emitter selectively emits a beam of light so the wheel light emitter may be visible to an observer. A power supply is coupled to the front light emitter. The power supply is operationally coupled to the front light emitter and the rear light emitter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF THE DRAWINGS

The disclosure will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
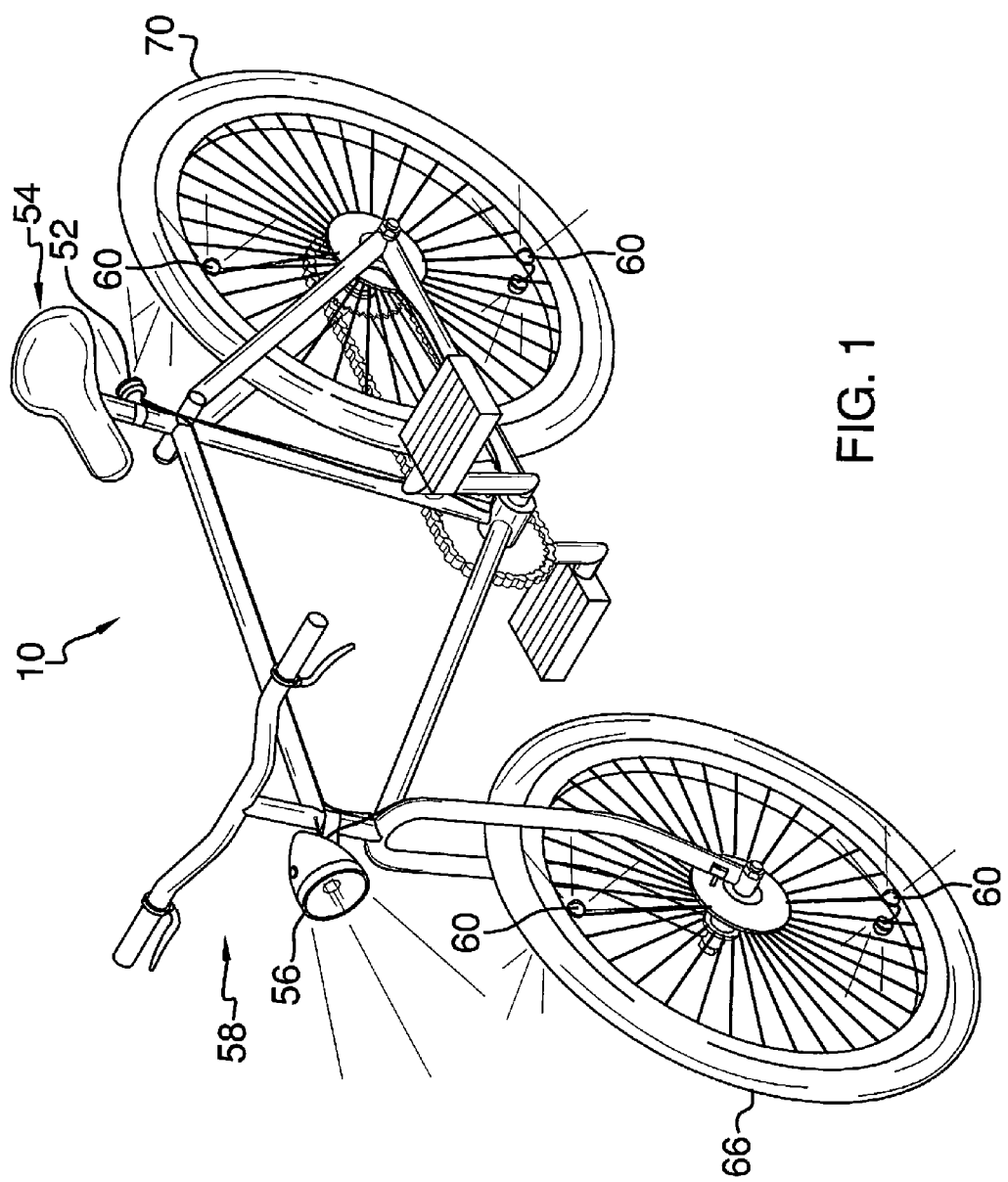
FIG. 1 is a perspective view of a bicycle illumination conductor assembly according to an embodiment of the disclosure.
Figure 2:
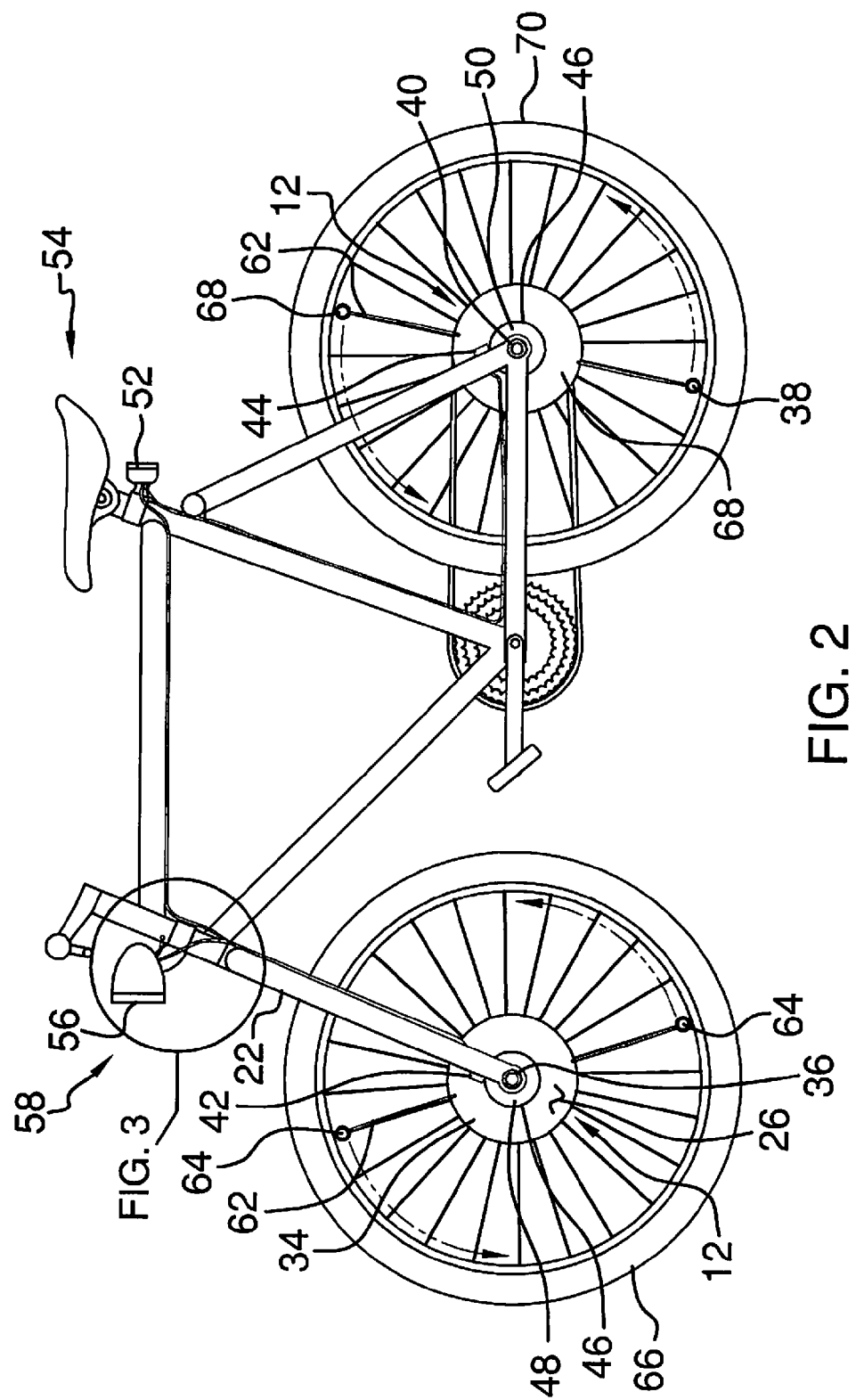
FIG. 2 is a left side view of an embodiment of the disclosure.
Figure 3:
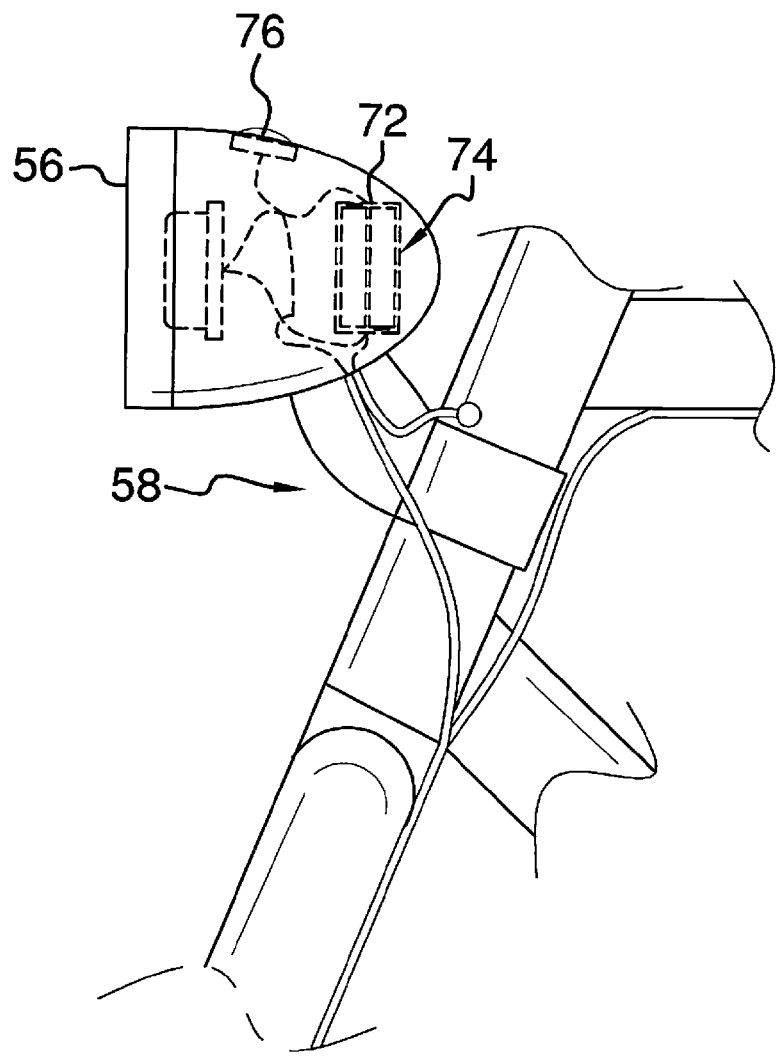
FIG. 3 is a left side phantom view of an embodiment of the disclosure.
Figure 4:
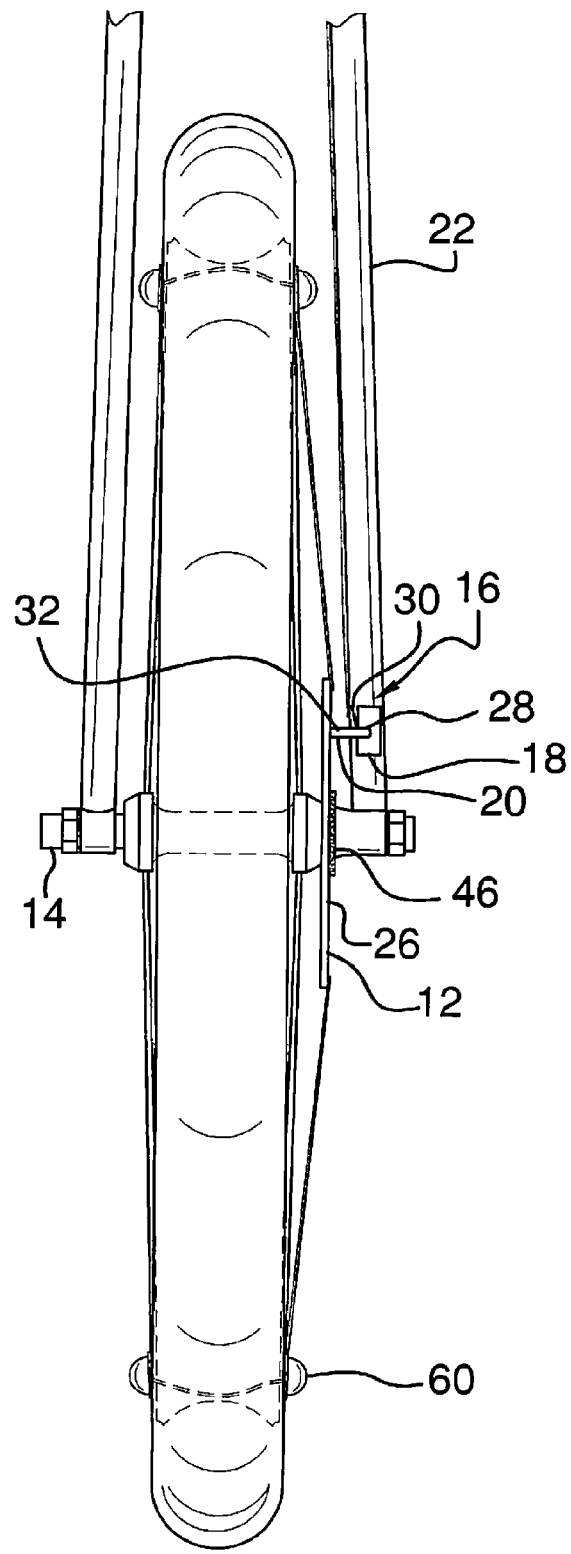
FIG. 4 is a front view of an embodiment of the disclosure.
Figure 5:
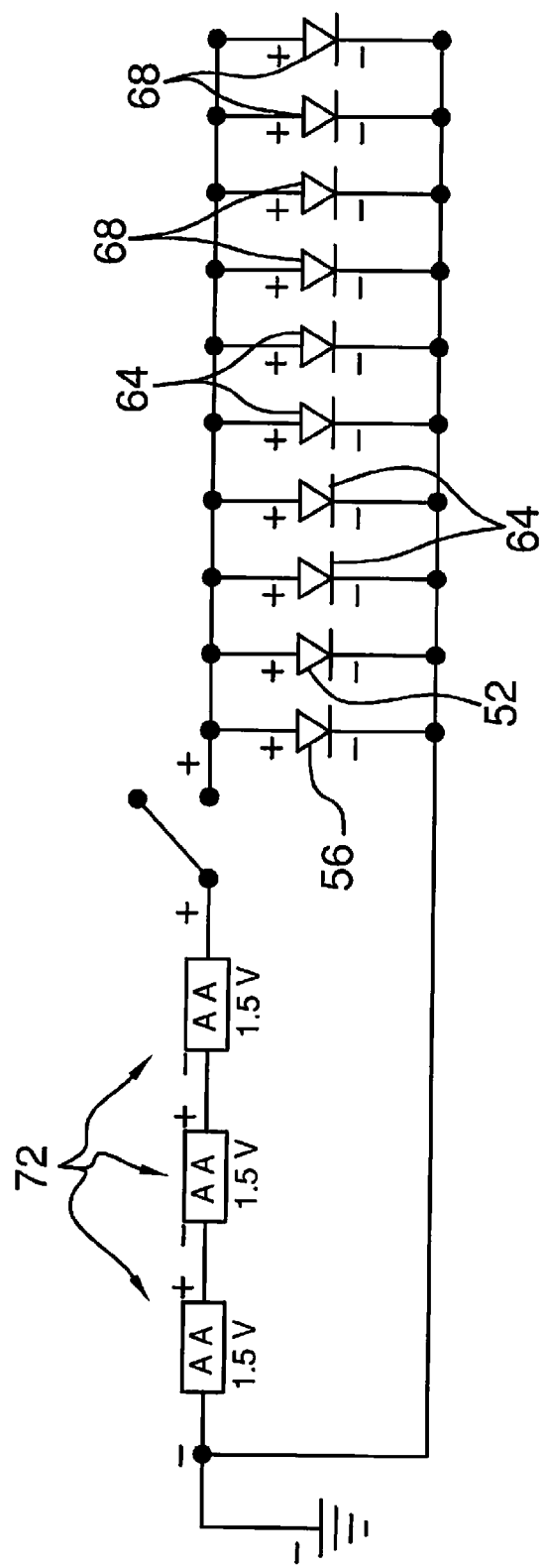
FIG. 5 is a schematic view of an embodiment of the disclosure.

With reference now to the drawings, and in particular to FIGS. 1 through 5 thereof, a new bicycle illumination conductor assembly embodying the principles and concepts of an embodiment of the disclosure and generally designated by the reference numeral 10 will be described.

As best illustrated in FIGS. 1 through 5, the bicycle illumination conductor assembly 10 generally comprises a primary plate 12 that is fixedly coupled to a bicycle axle 14 so the primary plate 12 may rotate with the bicycle axle 14. The primary plate 12 is electrically insulated from the bicycle axle 14. The primary plate 12 may be comprised of a rigid and electrically conductive material. The primary plate 12 may have a diameter between 10 cm and 15 cm.

A secondary member 16 has a mount 18 and a conductor 20 coupled to and extending away from the mount 18. The mount 18 is coupled to a frame 22 of the bicycle 24 proximal the bicycle axle 14. The conductor 20 extends toward and frictionally engages a front surface 26 of the primary plate 12 so the conductor 20 is electrically coupled to the primary plate 12. A biasing member 28 is coupled between a coupled end 30 of the conductor 20 and the mount 18. The biasing member 28 biases a free end 32 of the conductor 20 toward the primary plate 12. The conductor 20 may be comprised of a rigid and electrically conductive material.

The primary plate 12 is one of a pair of primary plates 12. A first one 34 of the primary plates 12 is coupled to a front bicycle axle 36. A second one 38 of the primary plates 12 is coupled to a rear bicycle axle 40. The secondary member 16 is one of a pair of secondary members 16. A first one 42 of the secondary members 16 is coupled to the frame 22 of the bicycle 24 proximal the front bicycle axle 36. A second one 44 of the secondary members 16 is coupled to the frame 22 of the bicycle 24 proximal the rear bicycle axle 40.

An insulating plate 46 is coupled to the bicycle axle 14. The insulating plate 46 is positioned between the primary plate 12 and the bicycle axle 14. The insulating plate 46 electrically insulates the primary plate 12 from the bicycle axle 14. The insulating plate 46 may be comprised of a rigid and electrically insulating material. The insulating plate 46 may have a diameter between 5 cm and 7.5 cm.

The insulating plate 46 is one of a pair of insulating plates 46. A first one 48 of the insulating plates 46 is coupled to the front bicycle axle 36 such that the first insulating plate 48 is positioned between the first primary plate 34 and the front bicycle axle 36. A second one 50 of the insulating plates 46 is coupled to the rear bicycle axle 40 such that the second insulating plate 50 is positioned between the second primary plate 38 and the rear bicycle axle 40.

A rear light emitter 52 is coupled to a rear of the bicycle 54. The rear light emitter 52 is electrically coupled to the conductor 20 of the second secondary member 44. The rear light emitter 52 may comprise and LED with a voltage drop between 1.8 volts DC and 2 volts DC. The rear light emitter 52 selectively emits a beam of light so the rear light emitter 52 is configured to be visible to an observer.

A front light emitter 56 is coupled to a front of the bicycle 58. The front light emitter 56 is electrically coupled to the conductor 20 of the first secondary member 42 and the rear light emitter 52. The front light emitter 56 may comprise an LED with a voltage drop between 1.8 volts DC and 2 volts DC. The front light emitter 56 selectively emits a beam of light so the front light emitter 56 may be visible to an observer.

A wheel light emitter 60 coupled to a spoke 62 on the bicycle 24. The wheel light emitter 60 selectively emits a beam of light so the wheel light emitter 60 may be visible to an observer. The wheel light emitters may comprise an LED with a voltage drop between 1.8 volts DC and 2 volts DC. The wheel light emitter 60 is one of a plurality of wheel light emitters 60.

The plurality comprises a pair of front wheel light emitters 64 coupled to a selected spoke 62 of a front bicycle wheel 66 and a pair of rear wheel light emitters 68 coupled to a selected spoke 62 of a rear bicycle wheel 70. Each of the front wheel light emitters 64 is electrically coupled to the selected spoke 62 of the front bicycle wheel 66 and the first primary plate 34. Each of the rear wheel light emitters 68 is electrically coupled to the selected spoke 62 of the rear bicycle wheel 70 and the second primary plate 38. Each of the first 34 and second 38 primary plates may deliver a DC voltage to associated ones of the wheel light emitters 60. The selected spoke 62 of the associated front 66 and rear 70 bicycle wheels may provide a ground for the associated wheel light emitter 60.

A power supply 72 is coupled to the front light emitter 56. The power supply 72 provides a DC voltage to the front light emitter 56 and the rear light emitter 52. The DC voltage is delivered to the conductors 20 of each of the first 42 and second 44 secondary members. Each of the conductors 20 of the first 42 and second 44 secondary members delivers the DC voltage to associated ones of the wheel light emitters 60 through an associated one of the first 34 and second 38 primary plates. The power supply 72 is electrically coupled to the frame 22 of the bicycle 24 so the power supply 72 may be in electrical communication with the rear light emitter 52 and each of the front 64 and rear 68 wheel light emitters. The power supply 72 may comprise as least one battery 74.

An actuator 76 is coupled to the front light emitter 56. The actuator 76 is in electrical communication with the power supply 72 so the actuator 76 may selectively actuate and de-actuate the power supply 72. The actuator 76 may cause the power supply 72 to deliver the DC voltage to the front light emitter 56, the rear light emitter 52 and the conductors 20 of each of the first 42 and second 44 secondary members.

In use, the assembly 10 may be used to alert an observer to the presence of the bicycle 24 at night. The assembly 10 may additionally be used to comply with bicycle 24 safety laws.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure.

We claim:

1. A bicycle illumination conductor assembly configured to be mounted to a bicycle axle, said assembly comprising:
   a primary plate coupled the bicycle axle;
   a secondary member coupled to the bicycle, said secondary member being operationally coupled to said primary plate, said secondary member being having a mount coupled to said frame and a conductor coupled to and extending away from said mount such that said mount is positioned directly between said frame and said primary plate;
   a front light emitter coupled to a front of the bicycle, said front light emitter being operationally coupled to said secondary member, said front light emitter selectively emitting a beam of light whereby said front light emitter is configured to be visible to an observer;
   a rear light emitter coupled to a rear of the bicycle, said rear light emitter being operationally coupled to said secondary member, said rear light emitter selectively emitting a beam of light whereby said rear light emitter is configured to be visible to an observer;
   a wheel light emitter coupled to a spoke on the bicycle, said wheel light emitter being operationally coupled to said primary plate, said wheel light emitter selectively emitting a beam of light whereby said wheel light emitter is configured to be visible to an observer; and
   a power supply coupled to said front light emitter, said power supply being operationally coupled to said front light emitter and said rear light emitter.

2. The assembly according to claim 1, further including said primary plate being fixedly coupled to the bicycle axle whereby said primary plate is configured to rotate with the bicycle axle.

3. The assembly according to claim 1, further including said primary plate being electrically insulated from the bicycle axle.

4. The assembly according to claim 1, further including said mount being coupled to a frame of the bicycle proximal the bicycle axle such that said conductor extends toward and frictionally engages a front surface of said primary plate whereby said conductor is electrically coupled to said primary plate.

5. The assembly according to claim 1, further including an insulating plate coupled to the bicycle axle, said insulating plate being positioned between said primary plate and the bicycle axle whereby said insulating plate is configured to electrically insulate said primary plate from the bicycle axle.

6. The assembly according to claim 1, further including said primary plate being one of a pair of primary plates, a first one of said primary plates being coupled to a front bicycle axle, a second one of said primary plates being coupled to a rear bicycle axle.

7. The assembly according to claim 6, further comprising:
   an insulating plate coupled to the bicycle axle;
   said insulating plate being one of a pair of insulating plates, a first one of said insulating plates being coupled to the front bicycle axle such that said first insulating plate is positioned between said first primary plate and the front bicycle axle, a second one of said insulating plates being coupled to the rear bicycle axle such that said second insulating plate is positioned between said second primary plate and the rear bicycle axle.

8. The assembly according to claim 1, further including said secondary member being one of a pair of secondary members, a first one of said secondary members being coupled to a frame of the bicycle proximal a front bicycle axle, a second one of said secondary members being coupled to the frame of the bicycle proximal a rear bicycle axle.

9. The assembly according to claim 1, further comprising:
   a first one of said secondary members being coupled proximal a front bicycle axle;
   said first secondary member being having a mount and a conductor coupled to and extending away from said mount; and said front light emitter being electrically coupled to said conductor of said first secondary member and said rear light emitter.

10. The assembly according to claim 1, further comprising:
  a second one of said secondary members being coupled to a rear bicycle axle;
  said second secondary member being having a mount and a conductor coupled to and extending away from said mount; and
  said rear light emitter being electrically coupled to said conductor of said second secondary member.

11. The assembly according to claim 1, further including said wheel light emitter being one of a plurality of wheel light emitters, said plurality comprising a pair of front wheel light emitters coupled to a selected spoke of a front bicycle wheel and a pair of rear wheel light emitters coupled to a selected spoke of a rear bicycle wheel.

12. The assembly according to claim 11, further comprising:
  a first one of said primary plates being coupled to a front bicycle axle; and
  each of said front wheel light emitters being electrically coupled to the selected spoke of the front bicycle wheel and said first primary plate.

13. The assembly according to claim 11, further comprising:
  a second one of said primary plates being coupled to a rear bicycle axle; and
  each of said rear wheel light emitters being electrically coupled to the selected spoke of the rear bicycle wheel and said second primary plate.

14. The assembly according to claim 1, further including said power supply being electrically coupled to said front light emitter, said power supply being electrically coupled to a frame of the bicycle whereby said power supply is configured to be in electrical communication with said rear light emitter and each of said front and rear wheel light emitters.

15. The assembly according to claim 1, further including said power supply comprising as least one battery.

16. The assembly according to claim 1, further including an actuator coupled to said front light emitter, said actuator being in electrical communication with said power supply whereby said actuator is configured to selectively actuate and de-actuate said power supply.

17. A bicycle illumination conductor assembly configured to be mounted to a bicycle axle, said assembly comprising:
  a primary plate being fixedly coupled to a bicycle axle whereby said primary plate is configured to rotate with the bicycle axle, said primary plate being electrically insulated from the bicycle axle;
  a secondary member having a mount and a conductor coupled to and extending away from said mount, said mount being coupled to a frame of the bicycle proximal the bicycle axle such that said mount is positioned directly between said frame and said primary plate and said conductor extends toward and frictionally engages a front surface of said primary plate whereby said conductor is electrically coupled to said primary plate, said primary plate being one of a pair of primary plates, a first one of said primary plates being coupled to a front bicycle axle, a second one of said primary plates being coupled to a rear bicycle axle, said secondary member being one of a pair of secondary members, a first one of said secondary members being coupled to a frame of the bicycle proximal a front bicycle axle, a second one of said secondary members being coupled to the frame of the bicycle proximal a rear bicycle axle;
  an insulating plate coupled to the bicycle axle, said insulating plate being positioned between said primary plate and the bicycle axle whereby said insulating plate is configured to electrically insulate said primary plate from the bicycle axle, said insulating plate being one of a pair of insulating plates, a first one of said insulating plates being coupled to the front bicycle axle such that said first insulating plate is positioned between said first primary plate and the front bicycle axle, a second one of said insulating plates being coupled to the rear bicycle axle such that said second insulating plate is positioned between said second primary plate and the rear bicycle axle;
  a front light emitter coupled to a front of the bicycle, said front light emitter being electrically coupled to said conductor of said first secondary member and said rear light emitter, said front light emitter selectively emitting a beam of light whereby said front light emitter is configured to be visible to an observer;
  a rear light emitter coupled to a rear of the bicycle, said rear light emitter being electrically coupled to said conductor of said second secondary member, said rear light emitter selectively emitting a beam of light whereby said rear light emitter is configured to be visible to an observer;
  a wheel light emitter coupled to a spoke on the bicycle, said wheel light emitter selectively emitting a beam of light whereby said wheel light emitter is configured to be visible to an observer, said wheel light emitter being one of a plurality of wheel light emitters, said plurality comprising a pair of front wheel light emitters coupled to a selected spoke of a front bicycle wheel and a pair of rear wheel light emitters coupled to a selected spoke of a rear bicycle wheel, each of said front wheel light emitters being electrically coupled to the selected spoke of the front bicycle wheel and said first primary plate, each of said rear wheel light emitters being electrically coupled to the selected spoke of the rear bicycle wheel and said second primary plate;
  a power supply coupled to said front light emitter, being electrically coupled to said front light emitter, said power supply being electrically coupled to a frame of the bicycle whereby said power supply is configured to be in electrical communication with said rear light emitter and each of said front and rear wheel light emitters, said power supply comprising as least one battery; and
  an actuator coupled to said front light emitter, said actuator being in electrical communication with said power supply whereby said actuator is configured to selectively actuate and de-actuate said power supply.

\* \* \* \* \*